United States Patent [19]
Boggs

[11] 3,823,960
[45] July 16, 1974

[54] FIFTH WHEEL SAFETY LOCK

[76] Inventor: Jack L. Boggs, 1239 Chandler Ave., Akron, Ohio 44313

[22] Filed: Sept. 25, 1972

[21] Appl. No.: 292,180

[52] U.S. Cl. .............................................. 280/432
[51] Int. Cl. ............................................ B62d 53/10
[58] Field of Search ........... 280/432, 431, 433, 434, 280/435, 436, 437

[56] References Cited
UNITED STATES PATENTS
| | | | |
|---|---|---|---|
| 2,258,432 | 10/1941 | Winn | 280/432 R |
| 2,317,508 | 4/1943 | Zoder | 280/432 X |
| 2,736,573 | 2/1956 | Fuschi | 280/432 R |

Primary Examiner—Leo Friaglia
Assistant Examiner—Randall A. Schrencengost
Attorney, Agent, or Firm—John J. Murphey

[57] ABSTRACT

A safety lock to prevent unwanted disengagement of vehicles connected by a fifth wheel coupling comprising a bolt reciprocally mounted under the radially opening slot in a fifth wheel plate, pressurized fluid driven means connected between the leading vehicle's brake system and the bolt for raising the bolt into the slot and holding it in the slot during operation of the vehicles wherein the bolt is capable of abutting engagement with the king pin of the trailing vehicle upon longitudinal movement of the pin along the slot and means for preventing the bolt from being pushed longitudinally out of the opened end of the slot.

15 Claims, 4 Drawing Figures

PATENTED JUL 16 1974 3,823,960
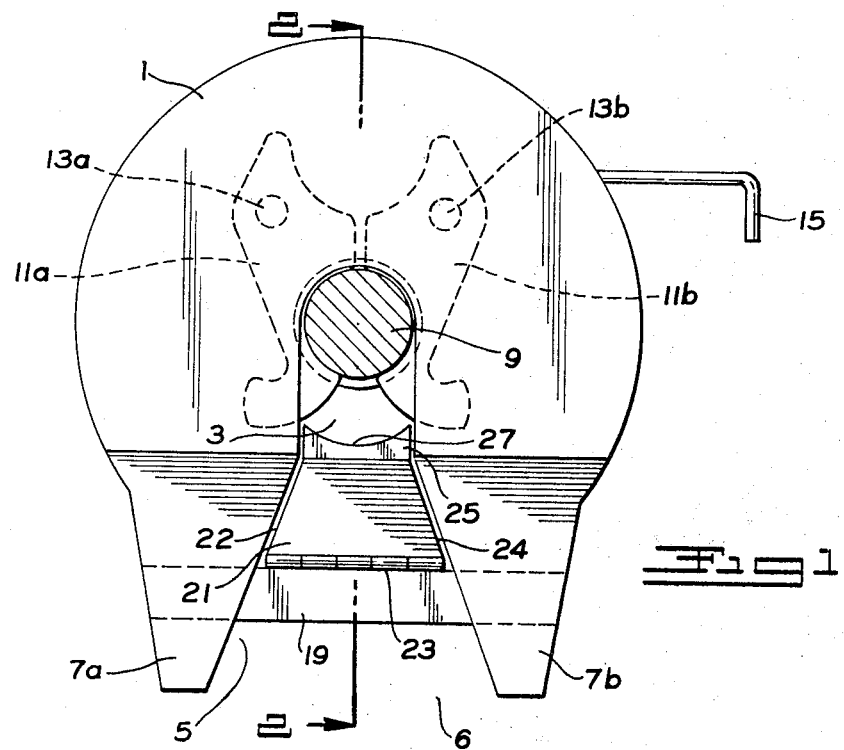
Fig. 1
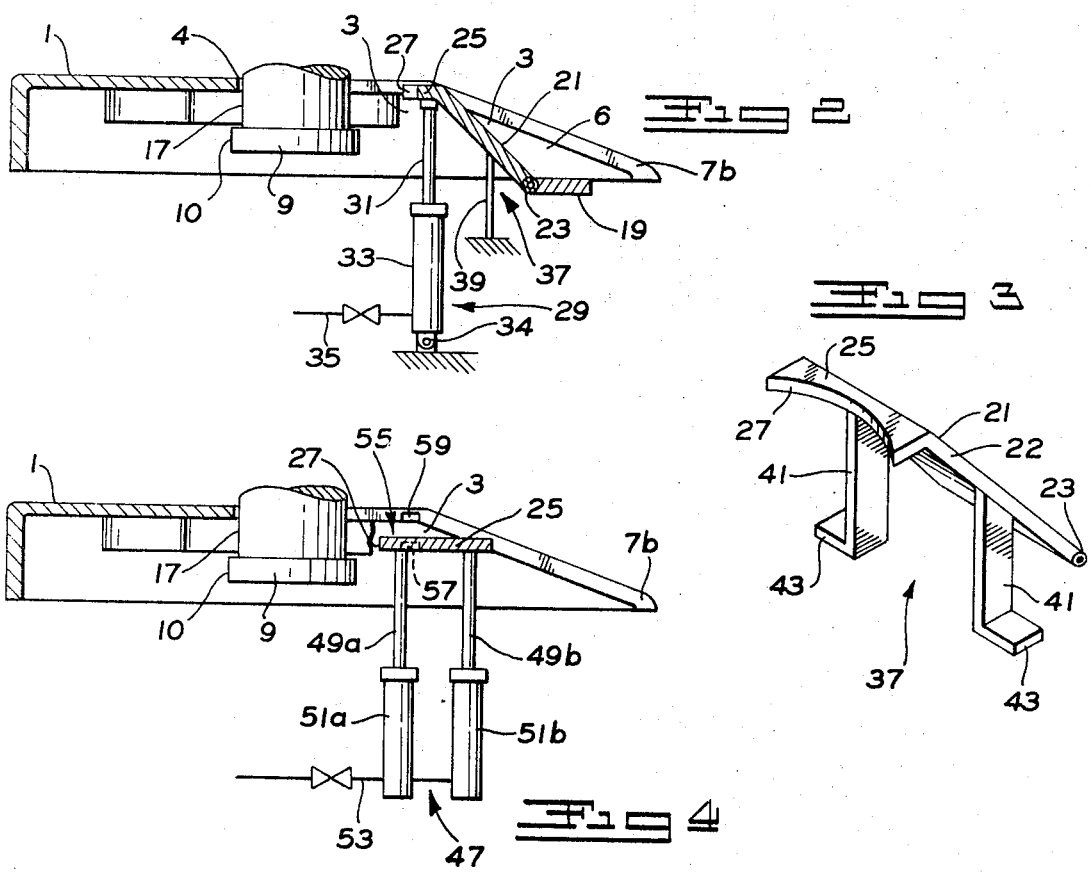
Fig. 2
Fig. 3
Fig. 4

FIFTH WHEEL SAFETY LOCK

BACKGROUND OF THE INVENTION

Fifth wheel couplings for trucks, trailers, and other vehicles are known in the art. These couplings are generally used to connect a variety of large vehicles together such as tractors and trailers, trailers and semi-trailer units (U.S. Pat. No. 3,556,560), etc.

Fifth wheel couplings generally comprise a round fifth wheel plate on one vehicle having a slot opening radially therefrom, a king pin on the other vehicle for complemental sliding reception in the slot, and a means for holding the king pin in the closed end of the slot.

A major problem has been developed in that the king pins on may vehicles have been slipping longitudinally out of the fifth wheel slots allowing complete separation of the vehicles. There are two main reasons for this problem, the first being that vibrations generated from travel over uneven roads and the action of road dirt and engine exhaust causes the king pin holding means two work loose or break, and the second being the increase in acts of vandalism which take the form of persons actually disengaging the king pin holding means while the vehicle is temporarily stopped such as at traffic lights and at rest stops.

Upon failure or opening of the king pin holding means, the trailer being heavier than the tractor or lead vehicle, slides rearwardly out of the fifth wheel plate slot allowing it to fall to the road surface. At the last, the king pin is damaged as a result of striking the road, however, more often extensive damage is caused to the trailer's undercarriage and to the cargo in the trailer.

Attempts have been made to design stronger king pin holding means, however the acts of vandalism continue and disengagement of the holding means has not been prevented by these new designs. Other attempts have been made to prevent escape of the king pin by locating cross pins in the fifth wheel plate slot rearward of the king pin. These cross pins (U.S. Pat. No. 2,772,895) merely provide a pin slidingly mounted across the slot. Not only are these type of locks subject to the same acts of vandalism as described in connection with the king pin holding means but the aforementioned vibration, dirt and fumes cause them to shift loose or break.

SUMMARY OF THE INVENTION

Therefore, the main object of this invention is a safety lock for fifth wheel couplings that prevents unwanted and unexpected uncoupling of the vehicles. Further objects include a safety lock for a fifth wheel coupling that will remain in constant locked position during all powered operations (i.e., road travel, idle, etc.) of the vehicle; a lock that cannot be opened or disengaged during powered operation of the vehicle without either the conscious effort of the vehicle operator or attendant or the complete failure of the pressurized fluid system in the vehicle; a safety lock for fifth wheel couplings that maintains integrity of the coupling in the event of either failure or disengagement of the king pin holding means; and a safety lock that prevents separation of fifth wheel coupled vehicles upon accidental disengagement of the king pin holding means.

This invention comprises a bolt mounted adjacent the fifth wheel plate and adapted to reciprocate vertically in the plate slot, means in communication with a pressurized fluid system in at least one of the vehicles for raising the bolt in the slot to a position wherein it is capable of engaging the king pin upon extended longitudinal movement of the pin in the slot and means for preventing the bolt from sliding out of the open end of the slot.

BRIEF DESCRIPTION OF THE DRAWINGS

FIG. 1 is a top plan view of a conventional fifth wheel coupling showing one embodiment of the safety lock of this invention.

FIG. 2 is a section sideview of the coupling taken along the lines 2 — 2 in FIG. 1.

FIG. 3 is an isometric view of another embodiment of the bolt of this invention.

FIG. 4 is a sectional sideview of the coupling taken along lines 2 — 2 in FIG. 1 showing another embodiment of the safety lock of this invention.

DESCRIPTION OF THE PREFERRED EMBODIMENTS

Turning now the drawings where like elements are identifed with like numerals throughout the four figures, FIG. 1 shows a top view of a conventional fifth wheel coupling that is located between the coupled vehicles and shows a fifth wheel plate or platform 1 of generally round or circular outline having a slot or elongated passageway 3 opening radially from the rearward portion thereof forming a closed end 4 and an open end 6. Slot 3 diverges toward open end 6 to form a king pin guideway 5 for introducing a king pin therein during the coupling operation of the vehicle. Guideway 5 is bounded on the sides by two fifth wheel plate ears or tabs 7a and 7b.

FIG. 1 shows in sectional view a king pin 9 in coupled position in plate 1. King pin 9 has an enlarged end 10, shown in dotted outline that catches under closed slot end 4 to prevent vertical disengagement of the pin from slot 3. Beneath plate 1 and shown in dotted outline are a pair of jaws or grips 11a and 11b as part of the king pin holding means that pivot about a pair of shafts 13a and 13b in response to movement of an engaging lever 15 and engage a reduced diameter portion 17 of king pin 9 so as to allow it to rotate freely but to prevent it from sliding longitudinally along slot 3. The rest of the holding means is not shown and the reader is referred to U.S. Pat. Nos. 2,982,566 and 3,640,549 for further details.

Also shown in FIG. 1 is one embodiment of the locking device of this invention and comprises a base or arm 19 mounted below and adjacent slot 3 and fastened such as by welding to the bottom or underside of plate 1. Base 19 is preferably made to span substantially the full distance between ears 7a and 7b to provide a strong support. A frame 21 having sides 22 and 24 correspondingly parallel to the adjacent sides of guideway 5 is pivoted to base 19 through a hinge 23 that spans therebetween across the front edge of base 19 in guideway 5. Frame 21 may be a plate, as is shown in FIG. 2, or may be constructed of a network of beams, channels, etc. A bolt 25 extends from frame 21 and is the member which, when raised into position by a power driven means to be described later, is capable of engaging king pin 9 as it slides longitudinally along slot 3 toward open end 6. Bolt 25 is preferably formed with a horizontally concave bolt head or abutting surface 27 to provide wide area contact with king pin 9, however, it may be of other configurations such as flat, convex, or a combination thereof. Bolt 25 is adapted to move vertically in slot 3 by a power driven means generally indicated at 29.

Means 29, as shown in FIG. 2, comprises an arm or piston rod 31 that is attached to or depends from frame 21 and extends below fifth wheel plate 1 into a cylinder 33. A piston (not shown) is attached to the free end of piston rod 31 and is in sealed sliding engagement with the inner walls of cylinder 33. Cylinder 33 is preferably anchored to the vehicle undercarriage by a bracket and pin 34. Fluid from a pressurized fluid system in at least one of the vehicles, such as the brake system, enters the bottom end of cylinder 33 through duct and valving 35. When pressurized from the vehicle's engine, the fluid entering through duct and valving 35 forces the piston and piston rod 31 out of cylinder 33 thereby raising frame 21 and bolt 25 into safety locking position in slot 3 as shown in FIG. 2.

Upon opening of jaws 11a and 11b through mechanical failure or overt act and under the influence of the differential size and weight of the leading vehicle relative to the trailing vehicle coupled thereto, king pin 9 will start to slide toward open end 6 of slot 3 and engage bolt 25 to prevent further movement or escape of king pin 9 from wheel plate 1.

Restraint means generally indicated at 37 is provided to prevent bolt 25 from sliding longitudinally out of slot 3 and guide way 5. Means 37, as shown in FIG. 2, comprises a restraint 39, anchored to frame 21 and to an immovable member such as the vehicle chassis, that is of a length sufficient to allow bolt 25 to rise in slot 3 only to a position wherein it is capable of engaging king pin 9. Further raising of bolt 25 in a direction toward king pin guideway 5 is therefore prevented by restraint 39. Restraint 39 may take the form of a chain, steel wire, or other strong flexible element that has little, if any, stretchability or extensibility.

All during the time the vehicle's engine is running the fluid system is pressurized. Hence, piston rod 31 is extended under this pressurization and, between it and means 37, holds bolt 25 in its locking position. One of the salutory features of this invention is that the lock is maintained in operative locking position all the time the vehicle is under powered operation. Upon shutdown of the vehicle's engine, the pressure in the fluid system decreases thereby allowing piston rod 31 to recede into cylinder 33 and unlock or lower bolt 25 and frame 21 in slot 3 below the bottom of king pin 9. Optionally, a check valve may be inserted in fluid line 35 to prevent unlocking during engine shutdown. If the weight of frame 21 and bolt 25 is not sufficient to push piston 31 into cylinder 33 upon release of fluid pressure, a return spring or other such biasing means may be included either in means 29 or means 37 to effect this unlocking. Another outstanding feature of this invention is that disengagement of the king pin holding means will not affect the locking ability of bolt 25 so that the aforementioned acts of vandalism are effectively nullified.

The fluid system used to actuate means 29 is preferably the fluid in the vehicle's brake system as it is under constant high pressure during travel and other powered operations of the vehicle. In most cases, pressurized air is used, however, it is contemplated herein that pressurized hydraulic fluid may also be used. During normal tractor-trailer uncoupling and coupling it is conventional to set the mechanical brakes on the trailer and not connect the air brakes until coupling or uncoupling is completed. It is therefore desirable to connect means 29 to the air brake system so that during the coupling or uncoupling operation, bolt 25 is below slot 3 and out of interference with king pin 9. Upon connecting the air brake system to the tractor, bolt 25 is immediately forced into locking position and will remain there until the next coupling or uncoupling operation is commenced.

Another embodiment of means 37 is shown in FIG. 3 and comprises a pair of legs 41 that extend downward or depend from the side edges 22 and 24 of frame 21 and ears 43 that extend outwardly from legs 41. As frame 21 and bolt 25 are raised into position by means 29, ears 43 engage the bottom of fifth wheel plate 1 or other convenient stop and prevent movement of bolt 25 both further upward or longitudinally outward of slot 3.

FIG. 4 shows another embodiment of the safety lock of this invention and comprises a bolt 25 including a bolt head 27 that is mounted adjacent and preferably below fifth wheel plate 1 and adapted to reciprocate or move vertically in slot 3. Means generally indicated at 47 raises bolt 25 in slot 3 to a position wherein it will engage king pin 9 upon extended longitudinal movement of said pin toward open slot end 6. Means 47 comprises a pair of piston rods 49a and 49b that connect to or depend from the underside of bolt 25 and extend in sliding sealing relationship downwardly respectively into pistons (not shown) and cylinders 51a and 51b. Cylinders 51a and 51b are in communication with a pressurized fluid system in at least one of the vehicles, such as the brake system of the driving vehicle, through ducts and related valving 53.

Means generally indicated at 55 prevents bolt 25 from sliding longitudinally out of slot 3 and comprises ears 57 that extend laterally from the sides of bolt 25 and, when bolt 25 is in locking position in slot 3, mate in complemental reception with detents 59 formed in the sides of slot 3 in plate 1. Means 55 may also comprise a plurality of protrusions such as gear teeth extending from the sides of bolt 27 that complementally engage another set of gear teeth cut or formed in the sides of slot 3 in wheel plate 1.

Upon pressurization of the fluid system, means 47 raises bolt 25 into slot 3 where ears 57 complementally engage detents 59. Continued pressurization during operation of the vehicle maintains bolt 25 in its locking position where bolt head 27 either concave, flat or convex etc., will engage king pin 9 during extended longitudinal movement of said pin in slot 3 and prevent its escape from open slot end 6.

A preferable routing of ducts and valving 35 and 53 includes a trip-off valve or indicator light or both mounted in the driving vehicle's cab so that the vehicle operator may monitor the resultant pressure in ducts 35 and 53 to insure that bolt 25 is moved into locking position upon pressurization of the fluid system in the vehicle.

What is claimed is:

1. In a fifth wheel coupling device for vehicles comprising a fifth wheel plate on one vehicle having a slot opening radially therefrom, a king pin on the other vehicle for complemental sliding reception in said slot, and means for holding said king pin in the closed end of said slot, a locking device to prevent unwanted uncoupling of the vehicles, comprising:
  a. a bolt mounted adjacent said fifth wheel plate and adapted for vertical reciprocal movement in said slot;
  b. fluid piston means in direct communication with a pressurized fluid system in at least one of the vehicles for raising said bolt in said slot to a position wherein it is capable of engaging said king pin upon extended longitudinal movement of said pin toward the open end of said slot; and,
  c. means operably connected to said bolt for preventing said bolt from sliding longitudinally out of said slot.

2. The fifth wheel coupling device of claim 1 including means for lowering said bolt in said slot below said king pin to permit coupling and uncoupling of said vehicles.

3. The fifth wheel coupling device of claim 1 including a bolt head formed in said bolt for direct contact with said king pin.

4. The fifth wheel coupling device of claim 1 wherein said pressurized fluid system is a compressed air system.

5. The fifth wheel coupling device of claim one wherein said pressurized fluid system is a pressurized hydraulic fluid system.

6. The fifth wheel coupling device of claim 1 wherein said means for preventing said bolt from sliding longitudinally out of said slot comprises ears extending from the sides of said bolt and detents formed in said fifth wheel plate slot to complementally receive said ears.

7. In a fifth wheel coupling device for vehicles comprising a horizontally positioned fifth wheel plate on one vehicle having a slot opening radially therefrom, a vertical king pin on the other vehicle for complemental sliding reception in said slot, and means for holding said king pin in said slot, a locking device to prevent unwanted uncoupling of the vehicles, comprising:
  a. a base mounted below said slot;
  b. a frame pivotally mounted to said base;
  c. a bolt extending from said frame adapted to move vertically in said slot;
  d. fluid driven piston means in communication with a pressurized fluid system in at least one of said vehicles and directly connected to said frame for pivoting said frame and raising said bolt in said slot and holding said bolt in a position wherein it is capable of engaging said king pin to prevent escape of said pin from said slot while the vehicle is in operation; and,
  e. means operably connected to said frame for preventing said bolt from sliding longitudinally out of said slot.

8. The fifth wheel coupling device of claim 7 wherein said means for raising said bolt in said slot comprises a piston rod depending from said bolt, a piston and cylinder in slidingly sealing engagement with said piston rod, and means communicating said cylinder with a pressurized fluid system in at least one of the vehicles for reciprocating said rod in said cylinder.

9. The fifth wheel coupling device of claim 7 wherein said frame comprises a plate having sides correspondingly parallel to the sides of said fifth wheel plate slot.

10. The fifth wheel coupling device of claim 7 including means for lowering said frame and bolt in said slot below said king pin to permit coupling and uncoupling of the vehicles.

11. The fifth wheel coupling device of claim 7 wherein said means for raising said bolt in said slot comprises a piston rod attached to said frame, a piston attached to the opposite end of said rod and in sealing sliding communication with a cylinder, and means for communicating said cylinder with said pressurized fluid system in at least one of said vehicles to move said piston rod reciprocally in said cylinder.

12. The fifth wheel coupling device of claim 7 wherein said means for preventing said bolt from sliding longitudinally out of said slot comprises a nonextensible, flexible restraint extending downward from said frame and to a rigid portion of the vehicle containing said fifth wheel plate to prevent, in conjunction with said frame pivot, further pivotal movement of said frame and bolt in said slot.

13. The fifth wheel coupling device of claim 7 wherein said means for preventing said bolt from sliding longitudinally out of said slot comprises legs depending from said frame and ears extending outward from said legs, said ears adapted to abut a stop during pivotal movement of said frame to prevent further pivotal movement.

14. A fifth wheel coupling device for vehicles comprising:
  a. a fifth wheel plate on one vehicle having a slot opening radially therefrom;
  b. a king pin on the other vehicle from complemental sliding reception in said slot;
  c. means connected to said fifth wheel plate for holding said king pin in said slot;
  d. a bolt mounted adjacent said fifth wheel plate and adapted for vertical reciprocal movement in said slot;
  e. fluid piston means in direct communication with a pressurized fluid system in at least one of the vehicles for raising said bolt in said slot to a position wherein it is capable of engaging said king pin upon extended longitudinal movement of said pin in said slot; and
  f. means operably connected to said bolt for preventing said bolt from sliding longitudinally out of said slot.

15. The fifth wheel coupling device of claim 14 including means for lowering said bolt in said slot below said king pin to permit coupling and uncoupling of said vehicles.

* * * * *